(12) United States Patent
Silvers et al.

(10) Patent No.: US 7,625,966 B2
(45) Date of Patent: Dec. 1, 2009

(54) ANHYDROUS PROTECTANT CHEMICAL COMPOSITION

(75) Inventors: Gary M. Silvers, Mission Viejo, CA (US); Ara Nercissiantz, Elsereno, CA (US)

(73) Assignee: Meguiar's Inc., Irvine, CA (US)

( * ) Notice: Subject to any disclaimer, the term of this patent is extended or adjusted under 35 U.S.C. 154(b) by 0 days.

(21) Appl. No.: 11/599,239

(22) Filed: Nov. 14, 2006

(65) Prior Publication Data

US 2008/0114109 A1   May 15, 2008

(51) Int. Cl.
*C08K 5/5419* (2006.01)
*C08G 2/00* (2006.01)
*C08L 31/00* (2006.01)
*C08L 33/06* (2006.01)

(52) U.S. Cl. .................. 524/267; 524/361; 524/556; 524/560

(58) Field of Classification Search ........... 524/267, 524/361, 376, 379, 560, 556
See application file for complete search history.

(56) References Cited

U.S. PATENT DOCUMENTS

| | | | | |
|---|---|---|---|---|
| 6,110,447 | A * | 8/2000 | Ramin et al. | 424/61 |
| 2005/0065271 | A1* | 3/2005 | Graham et al. | 524/523 |
| 2006/0207723 | A1* | 9/2006 | Kuhn et al. | 156/329 |
| 2006/0211820 | A1* | 9/2006 | Jonn et al. | 525/100 |

\* cited by examiner

*Primary Examiner*—Vasu Jagannathan
*Assistant Examiner*—Karuna P Reddy

(57) ABSTRACT

A highly resilient clear surface protectant is provided comprising of a copolymer, such as an isobutyl methacrylate, methyl methacrylate, or acrylic copolymer, in a hexamethyldisiloxane system. The hexamethyldisiloxane combined with a cosolvent package in a composition with a copolymer resin, such as an acrylic copolymer, enhances physical properties of coatings, such as unusual migration and spread and wetting on surfaces. The protectant formulation exhibits greater substantivity to surfaces such as aluminum, steel, brass, stainless steel and copper, and possesses enhanced spreading ability on surfaces to which it is applied resulting in improvement in physical properties in protection of metal surfaces against the deterioration caused by oxidation, degradation and corrosion.

14 Claims, No Drawings

ANHYDROUS PROTECTANT CHEMICAL COMPOSITION

BACKGROUND OF THE INVENTION

1. Field of the Invention

This invention is directed to a surface protectant composition for use on metal surfaces. More specifically, embodiments of the invention are directed to an anhydrous protectant composition including one or more copolymers, a cosolvent and hexamethyldisiloxane (HMDS).

2. Description of Related Art

Surfaces such as marine metal surfaces are becoming widespread. Increased use of various marine metal surfaces has caused demand for protecting; rust proofing, corrosion resistance, preserving, as well as protecting various metal surfaces exposed to highly corrosive environments. Metal protectants generally provide a high level of gloss to metallic surfaces, restore the appearance of the metal surface, and protect the surface against the environmental influences, heat, ocean water salt, ocean water immersion, salt fog, marine environment, acid rain, high humidity, and ultraviolet rays. In addition to providing a water repellent film on the surface, protectants typically offers protection against the effects ultraviolet radiation, and other environmental causes of degradation.

It is known that various polymer systems can be employed as an ingredient in formulations for application to surfaces, such as metals like aluminum, copper, brass, and stainless steel for the purpose of providing a protective coating. However, when products known in the art are applied as protective coatings for outdoor surfaces, such as marine application railings, metal surfaces including aluminum, copper and brass, or automotive metal surfaces, the coatings do not coat, spread and wet the surfaces at the rapid rate of this invention, resulting in coatings with surface, appearance and performance that is not desirable. Furthermore, some of the commercial coatings can rapidly abrade, corrode, discolor under heat and do not have good gloss or resilience.

SUMMARY

An object of the invention is to create a migrating protective coating with rapid spread resulting in enhanced cure rate, tensile modulus and durability in an exempt hexamethyldisiloxane system that results in a protective coating with enhanced shear modulus, degree of crystallinity and hardness for the substrate being protected.

A further object of the invention is to provide a copolymer system in a hexamethyldisiloxane solution system containing a copolymer such as acrylic, methacrylic, and isobutyl acrylic copolymers, that provide a metal surface with unusual physical and chemical resistance and luster.

It is a further object of the invention to include in the protective coating a cosolvent compatibilizer system comprising one or more of solvents selected from isopropyl alcohol, acetone, and dipropyleneglycol monopropylether (PNP) that make a protectant composition solution of acrylic methacrylic and/or isobutyl acrylic solution in hexamethyl disiloxane possible, combined with a high degree of spreadability.

It is a further object of the present invention to provide a protectant formulation which exhibits greater substantivity to metal surfaces such as aluminum, brass, copper, steel, stainless steel, and other metal surfaces used in marine and automotive applications.

It is a further object of the invention to enhance the migration and spread of the a protectant on surfaces, in particular metallic surfaces, and to impart high spread rate, resulting in an improvement of gloss, luster and protection of such surfaces against the deterioration caused by rust, corrosion, heat and environmental conditions.

It is a further object of the invention to provide a protectant composition with the ability to migrate, spread and wet surfaces at a rate of spread of about 5 centimeters diameter per 1-2 drops of liquid, which cures within about 3-5 minutes, rendering protection against harsh environmental conditions.

DETAILED DESCRIPTION

Embodiments of the present invention are directed to a composition for use in protecting metal surfaces, such as surfaces of land and marine vehicles. In particular embodiments, the composition is an anhydrous composition that comprises hexamethyldisiloxane (HMDS), a copolymer solvent, and a cosolvent.

In accordance with the present invention, a high spread metal protectant coating is developed which offers the advantage of extreme protection of surface against marine salt water, heat, corrosion, degradation. Upon application, the protectant composition shows extremely rapid migration and spread, where 1-2 drops of the material can migrate and spread to a diameter of about 5 cm diameter, leaving a highly lustrous protective surface on metallic surfaces. It has also been found that the protectants of the present invention provide better protection against heat, marine salt water and radiation in comparison with leading commercial protectant formulations. Such advantages are believed to flow from the presence of high spread copolymer resin in hexamethyl disiloxane HMDS in compatiblizer solvent package making it possible for the coating to migrate and spread a diameter of about 5 cms per 1-2 drops, and achieving about 1-4 micron thickness that results in optimal cure, about 3-5 minutes tack free time and cure and crosslink which enhances crystalinity and shear modulus and unusual physical durability.

In this invention the combination of silicone polymer hexamethyldisiloxane with copolymer system and compatiblizer cosolvent systems render a solution capable of migrating, and extremely rapid spread rate that results in ultra thin about 1-4 micron protectant and enhanced cure, crosslink density and tensile modulus combined with protection of surface in the fashion contemplated in accordance with the present invention is believed to be new. Physical properties include rapid migration, spread and wetting, fast dry, high humidity resistance, UV exposure, over 4 months roof exposure, immersion resistance, no fading or yellowing, and marine environment exposure for aluminum and stainless steel as well as salt spray, and exposure to acids and bases.

The protectant composition of the present invention includes hexamethyldisiloxane (HMDS), a copolymer solvent, and a cosolvent. The copolymer may be one or more of the following: acrylate copolymers, isobutyl methacrylates, methyl acrylates, methyl metacrylates, and acrylic polymers. The cosolvent may include one or more of the following: isopropyl alcohol, dipropylene glycol monopropyl ether (PNP), exempt solvent acetone, and dimethylketone.

The solvent solution is obtained by dissolving a copolymer solution into a the cosolvent system (which is a compatibilizer). The resultant solution is then added to exempt hexamethyldisiloxane over about 1-3 minutes.

In particular embodiments, the compositions of the present invention have a specific gravity of about 0.81 to about 0.83 g/ml. In further embodiments, the compositions show about 3 to about 5 minutes of dry time when aerosolized and spray applied. The compositions have high gloss, are highly resilient to humidity, and are highly resistant to temperature. The thickness of application achieved by the compositions in particular embodiments is between about 1 to about 4 microns.

In preferred embodiments, the protectant composition shows the following properties: an average thickness on a metal surface of about 1-4 microns, a spread/wetting of about 4-5 cm by 1-2 drops of composition, a dry to touch time of about 3-5 minutes, and a high gloss that is brilliant and glossy. In particular embodiments, the composition can withstand a high humidity over 3 months of 52° C., 45° C., or room temperature and an ocean water immersion over 3 months of 52° C., 45° C., or room temperature. A metal surface coated with the protectant composition shows no effect of exterior exposure in a marine environment over 4 months, no effect of roof exposure in a marine environment over 4 months, and no yellowing or discoloration of UV exposure over 3 months. In embodiments the protectant composition shows heat resistancy to 842° F. (450° C.), does not fade or haze, withstands acids for over 30 minutes, resists 3% salt water for over 3 months, resists 3% salt water in high humidity for over 3 months, resists salt fog for 86 hours with no yellowing/discoloration, and can be cured in ambient temperature without heat or baking.

The solution of copolymers in cosolvent compatibilizer and HDMS are clear liquids. In preferred embodiments, the liquids are nonirritating to the skin and exhibit unusual migration and spreadability when applied to metal surfaces. Once applied, the materials evaporate, leaving a thin layer of copolymer cured resin that dries to a high gloss, unusually resistant protectant coating.

A method of providing the protective coating to a metal substrate, such as marine metal surfaces, which are exposed to highly corrosive environments, involves aerosol spray application to the metal substrate of the protectant composition.

The protectant composition includes copolymer solution, preferably a methyl methacrylate, isobutyl acrylate, methyl methacrylate, ethyl acrylate, propyl acrylate, methylpropyl acrylate, butylacrylate, isopropylacruylate, and/or methyl isopropyl acrylate. The copolymer solution is preferably about 25 to about 33 percent by weight of the protectant composition. The copolymer solution may be predissolved in a cosolvent system. The cosolvent system may contain isopropyl alcohol (about 5 to about 9 percent by weight in the overall protectant composition), dimethyl ketone (about 5 to about 9 percent by weight in the overall protectant composition), and dipropylene glycol monopropyl ether (PnP) (about 18 to about 25 percent by weight in the overall protectant solution).

The premixed solution of the copolymer solution in the cosolvent system may then be introduced gradually into hexamethyl disiloxane (HMDS), which may be at about 30 to about 38 percent by weight of the final composition. The premixed solution and HMDS may be allowed to mix for about 3 to about 5 minutes. The resulting solution is preferably clear and has a specific gravity of about 0.63 to about 0.68 g/ml.

In further embodiments, other silixone fluids than HMDS may be used, for example, ciclomethicones, dimethicones, hexamethylsiloxanes, exempt volatile siloxanes (e.g., at about 0.65 centistokes), polydimethyl siloxanes (e.g., at about 1 centistoke), octamethyltrsiloxanes, decamethyltetrasiloxanes, dodecamethyltetrasiloxanes, polydimethylsiloxanes (e.g., at about 3 centistokes), dodecamethylpentasiloxane, and dimethicones (e.g., at about 5, 10, or 20 centistokes). Other volatile silicone fluids include dimethicone (e.g., at about 1 centistoke), dimethicone (e.g., at about 1.5 centistokes), dimethicone (e.g., at about 2 centistokes), cyclotetrasiloxane, cyclopentasiloxane, cyclohexasiloxane, and cyclomethicone (e.g., at about 3.5 centistokes).

The physical properties provided by the finish of the present invention can be attributed to the presence of the combination of copolymer resins compatibilized by the cosolvent system into the hexamethyl disiloxane system. This combination provides a protectant that has greater spreadability and enhanced protection in comparison to commercial formulations that do not contain the combination of copolymer resins with hexamethyl disiloxane solvent. Hence, the compositions of the present invention possess a more pronounced spreadability and physical resilience on metal surfaces. This is of particular significance in marine outdoor applications where the treated surface is exposed to varied and harsh weathering conditions.

In this invention it is contemplated that the composition of copolymer dissolved in HMDS with compatibilizer cosolvents has superior spread properties allowing the uniform migration of copolymer and maximizes the effect of crystalinity, minimizing rubbery amorphous properties and enhancing coating modulus, and producing highly resilient and temperature resistant clear coating protectant.

Unusually rapid spread of coating allows coating of about 1-4 microns thick protectant film that maximizes optimum crosslinking and full cure in lowest possible thickness, as a result of increasing modulus in rubbery regions with increased cure rate and crosslinks as molecular weight between crosslinks decrease, resulting in high shear modulus, increased Tg, which in turn enhances shear modulus and giving high temperature resistance of up to 450° C. (842° F.), higher than all other competitive products.

The compositions described herein are particularly useful on metal surfaces such as aluminum, copper, brass, steel, and stainless steel.

EXAMPLE I

A solution was made of the components in Table I.

TABLE I

| | % weight |
|---|---|
| HMDS | 35.5 |
| PNP | 21.0 |
| Acetone | 7.5 |
| Luster Seal-300 (LS-300) Copolymer (a methyl methacrylate copolymer from Tamms Industries, Inc.) | 28.5 |
| Isopropyl Alcohol | 7.5 |

A commercially available copolymer paraloid B-67 45% from Rohm and Haas, or surface sealer comprising an acrylic copolymer can be used at a ratio of 28.5%, is dissolved in a cosolvent blend comprising 7.5% isopropyl alcohol (IPA), 7.5% acetone and 21.0% dipropyleneglycol monopropyl ether (PNP).

The mixture was mixed at an ambient temperature for about 1-3 minutes to form a clear solution. The solution was then added to 35.5% by weight of hexamethyl disiloxane (HMDS) that can be commercially obtained as Volasil DM 0.65 or Volasil DM 0.65 SP from Chemsil Inc.

The resulting solution was clear and had physical properties including: specific gravity=0.83 g/ml; dry to touch time=5-7 min; average thickness=1-4 microns.

1-2 drops of the resulting solution when dropped over a metal surface had spread capabilities of about 4-5 cm in diameter, which is an unusual result of a combination of a copolymer system with HMDS and a cosolvent system. The resulting solution was packaged in a spray applicator and spray applied to several test substrates of aluminum, brass, copper, and stainless steel surfaces. The coated surfaces were tested in extended exposures in marine environments for protection. Evaluations of the treated surfaces revealed the unique spread, migration and wetting characteristics of the invention resulting in an extremely resilient protective coating. The results following outdoor exposure revealed that the surfaces treated with the composition produced a continuous higher gloss shinier appearance than other competitive products not utilizing HDMS/copolymer/cosolvent mixture, and would spread and wet surfaces better than the surfaces treated with the competitive products. Surfaces treated with the composition of this example and the other examples revealed in exterior testing of withstanding 4 months in a marine environment, as well as unique physical properties of heat resistance (about 450° C.), water repellency, and immersion tests in ocean salt water.

EXAMPLE II

A solution was made of the components in Table II.

TABLE II

|  | % weight |
|---|---|
| HMDS | 39.8 |
| PNP | 21.0 |
| Acetone | 7.5 |
| Paraloid B-67 45% | 24.2 |
| Isopropyl Alcohol | 7.5 |

The steps of Example I were repeated. Evaluations were the same as indicated in Example I.

EXAMPLE III

A solution was made of the components in Table III.

TABLE III

|  | % weight |
|---|---|
| HMDS | 39.75 |
| PNP | 21.0 |
| Acetone | 7.5 |
| Paraloid B-67 45% | 28.5 |
| Isopropyl Alcohol | 7.5 |
| F-810 | 0.05 |

The steps of Example I were repeated, except that F-810 fluorinated copolymer, a fluorinated silanol fluoropolymer from API, Inc., was added at 0.5%. Evaluations were the same as indicated in Example I. It was noted that the solution had exceptional wetting and spread ability on metal surfaces such as aluminum and marine stainless steel, copper and brass surfaces.

EXAMPLES IV-VII

Additional solutions were made of the components in Tables IV-VII, prepared in the same manner as Example I and exhibited similar properties.

TABLE IV

|  | % weight |
|---|---|
| HMDS | 42.8 |
| PNP | 24.0 |
| DMK | 16.0 |
| Paraloid B-67 45% | 17.2 |

TABLE V

|  | % weight |
|---|---|
| Chemsil 0.65 | 84.7 |
| D-536 (amino functionalized reactive silicone fluid from Dow Corning Co.) | 5.0 |
| Dow 20 (polydimethylsiloxane moisture cure coating from Dow Corning Co.) | 10.0 |
| A-1110 (gama-aminopropyltrimethoxysilane from GE Silicones) | 0.3 |

TABLE VI

|  | % weight |
|---|---|
| HMDS | 35.5 |
| PNP | 21.0 |
| Acetone | 7.5 |
| B-67 MT (methacrylic resin PARALOID B-67 MT from Rohm & Haas) | 28.5 |
| Isopropyl Alcohol | 7.5 |

TABLE VII

|  | % weight |
|---|---|
| HMDS | 16.5 |
| PNP | 8.5 |
| Paraloid B67 45% | 74.8 |
| Butter scotch fragrance | 0.2 |

The steps of Example I were repeated, except that F-810 fluorinated copolymer was added at 0.5%. Evaluations were the same as indicated in Example I.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A surface protectant composition comprising about 30% to about 38% by weight of hexamethyldisiloxane, a resin solution comprising a copolymer of methyl methacrylate and a monomer selected from the group consisting of alkyl acrylates having 4 to 7 carbon atoms, isobutyl methacrylate, and n-butyl methacrylate, and a cosolvent of at least two solvents selected from a group consisting of acetone, isopropyl alcohol and dipropylene glycol monopropyl ether, wherein the surface protectant composition has high surface spread on metal surfaces.

2. The surface protectant composition of claim 1, wherein the copolymer is a copolymer of methyl methacrylate and isobutyl methacrylate or n-butyl methacrylate.

3. The surface protectant composition of claim 1, wherein the surface protectant composition exhibits a spread about 5 centimeters diameter per 1-2 drops of liquid.

4. The surface protectant composition of claim 1, wherein the surface protectant composition exhibits a cure time of about 3 to about 5 minutes.

5. The surface protectant composition of claim 1, wherein the surface protectant composition achieves 1-4 micron thickness when used as a surface protectant.

6. The surface protectant composition of claim 1, wherein a metal surface coated with the surface protectant composition shows no effect of exterior exposure in a marine environment over 4 months.

7. The surface protectant composition of claim 1, wherein a metal surface coated with the surface protectant composition shows no effect of roof exposure in a marine environment over 4 months.

8. The surface protectant composition of claim 1, wherein the surface protectant composition shows heat resistance to 450° C (842° F).

9. The surface protectant composition of claim 1, wherein the surface protectant composition can be cured in ambient temperature without heat or baking.

10. The surface protectant composition of claim 1, wherein the surface composition resists 3% salt water.

11. The surface protectant composition of claim 1, wherein the surface protectant composition resists salt fog with no yellowing/discoloration.

12. A surface protectant composition of claim 1, wherein the surface protectant composition comprises about 30% to about 38% by weight of hexamethyldisiloxane, a solvent including a copolymer of methyl methacrylate and a monomer selected from the group consisting of alkyl acrylates having from 4 to 7 carbon atoms, isobutyl methacrylate, and n-butyl methacrylate, and a cosolvent of at least two solvents selected from a group consisting of acetone, isopropyl alcohol and dipropylene glycol monopropyl ether.

13. A surface protectant composition comprising about 30% to about 38% by weight of hexamethyldisiloxane, a resin solution comprising a copolymer of methyl methacrylate and a monomer selected from the group consisting of alkyl acrylates having from 4 to 7 carbon atoms, isobutyl methacrylate, and n-butyl methacrylate, and at least two solvents selected from a group consisting of acetone. isopropyl alcohol and dipropylene glycol monopropyl ether.

14. The surface protectant composition of claim 13, wherein the copolymer is selected from the group consisting of a copolymer of methyl methacrylate and an alkyl acrylate having from 4 to 7 carbon atoms, a copolymer of methyl methacrylate and isobutyl methacrylate, and a copolyrner of 45 mole % methyl methacrylate and 55 mole % n-butyl methacrylate.

* * * * *

UNITED STATES PATENT AND TRADEMARK OFFICE
CERTIFICATE OF CORRECTION

PATENT NO. : 7,625,966 B2
APPLICATION NO. : 11/599239
DATED : December 1, 2009
INVENTOR(S) : Gary Silvers It is certified that error appears in the above-identified patent and that said Letters Patent is hereby corrected as shown below:

Column 1,
Line 52-53, delete "acryilic" and insert -- acrylic --.

Column 2,
Line 34, delete "compatiblizer" and insert -- compatibilizer --.
Line 38, delete "crystalinity" and insert -- crystallinity --.
Line 41, delete "compatiblizer" and insert -- compatibilizer --.
Line 57, delete "metacrylates," and insert -- methacrylates, --.
Line 62, after "into" delete "a".

Column 3,
Line 41, delete "isopropylacruylate," and insert -- isopropylacrylate, --.
Line 60, delete "silixone" and insert -- siloxane --.
Line 61, delete "ciclomethicones," and insert -- cyclomethicones, --.
Line 64, delete "octamethyltrsiloxanes," and insert -- octamethyltrisiloxanes, --.

Column 4,
Line 22-23, delete "crystalinity," and insert -- crystallinity, --.

Column 6,
Table V, Line 21, delete "(gama-" and insert -- (gamma --.

Column 8,
Line 21, delete "acetone." and insert -- acetone, --.
Line 27, delete "copolyrner" and insert -- copolymer --.

Signed and Sealed this

Sixteenth Day of March, 2010

David J. Kappos
*Director of the United States Patent and Trademark Office*